(12) United States Patent
Eldrid et al.

(10) Patent No.: US 6,397,604 B2
(45) Date of Patent: Jun. 4, 2002

(54) COOLING SUPPLY SYSTEM FOR STAGE 3 BUCKET OF A GAS TURBINE

(75) Inventors: Sacheverel Quentin Eldrid, Saratoga Springs; James Lee Burns, Schenectady; Gene David Palmer, Clifton Park; Sal Albert Leone, Scotia, all of NY (US); Gary Joseph Drlik, Fairfield; Edward Eugene Gibler, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/773,369

(22) Filed: Feb. 1, 2001

Related U.S. Application Data

(63) Continuation of application No. 09/292,445, filed on Apr. 15, 1999, now abandoned.

(51) Int. Cl.$^7$ ................................................ F02C 7/18
(52) U.S. Cl. ............................ 60/782; 60/806; 415/115
(58) Field of Search ............................... 60/39.75, 782, 60/806; 415/114, 115, 116, 117

(56) References Cited

U.S. PATENT DOCUMENTS 5,340,274 A  *  8/1994  Cunha ......................... 415/115
6,019,573 A  *  2/2000  Uematsu et al. ............ 415/117

OTHER PUBLICATIONS

"39$^{th}$ GE Turbine State–of–the–Art Technology Seminar", Tab 1,"'F' Technology—the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines—Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.
"39th GE Turbine State–of–the–Art Technology Seminar", Tab 8, "Dry Low $NO_x$ Combustion Systems for GE Heavy–Duty Turbines", L. B. Davis, Aug. 1996.
"39th GE Turbine State–of–the–Art Technology Seminar", Tab 9, "GE Gas Turbine Combustion Flexibility", M. A. Davi, Aug. 1996.
"39th GE Turbine State–of–the–Art Technology Seminar", Tab 10, "Gas Fuel Clean–Up System Design Considerations for GE Heavy–Duty Gas Turbines", C. Wilkes, Aug. 1996.

(List continued on next page.)

Primary Examiner—Louis J. Casaregola
(74) Attorney, Agent, or Firm—Nixon & Vanderhye P.C.

(57) ABSTRACT

In a land based gas turbine including a compressor, a combustor and turbine section including at least three stages, an improvement comprising an inlet into a third stage nozzle from the compressor for feeding cooling air from the compressor to the third stage nozzle; at least one passageway running substantially radially through each airfoil of the third stage nozzle and an associated diaphragm, into an annular space between the rotor and the diaphragm; and passageways communicating between the annular space and individual buckets of the third stage.

14 Claims, 6 Drawing Sheets

OTHER PUBLICATIONS

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994—Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Technology Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "General Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", Vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low No$_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two-Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II ", The Role of Reactant Unmixedness, Strain Rate, and Length Scale on Premixed Combustor Performance", Samuelsen et al., pp. 415–422, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II "The Role of Reactant Unmixedness, Strain Rate, and Length Scale on Premixed Combustor Performance, Samuelsen et al.", p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting",vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low NO$_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, pp. 582, Oct., 1995.

"Proceedings of the Advanced Turbine Systems Annual Program Review Meeting", "ATS and the Industries of the Future", Denise Swink, pp. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,-552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1—Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing and Pre–Commercial Demonstration, Phase 3", Document #486029, Oct. 1—Dec. 31, 1995, Publication Date, May 1, 1997, Report Nos.: DOE/MC/31176–5340.

"Utility Advanced Turbine System (ATS) Technology Readiness Testing and Pre–Commercial Demonstration—Phase 3", Document #486132, Apr. 1—Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration—Phase 3", Document #587906, Jul. 1—Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1—Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration" Jan. 1—Mar. 31, 1996, DOE/MC/31176–5338.

"Utility Advanced Turbine System (ATS) Technology Readiness Testing: Phase 3R", Document #756552, Apr. 1—Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1—Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995—Sep. 30, 1996.

"Utility Advanced Turbine Systems (ATS) Technology Readiness Testing", Phase 3R, Annual Technical Progress Report, Reporting Period: Oct. 1, 1997—Sep. 30, 1998.

"Utility Advanced Turbine Systems (ATS) Technology Readiness Testing", Document #750405, Oct. 1—Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1—Jun. 29, 1998, Publication Date Oct. 29, 1998, Report Nos. DE–FC21–95MC31176–18.

"Utility Advanced Turbine Systems (ATS) Technology Readiness Testing—Phase 3", Annual Technical Progress Report, Reporting Period: Oct. 1, 1996—Sep. 30, 1997.

"Utility Advanced Turbine Systems (ATS) Technology Readiness Testing and Pre–Commercial Demonstration", Quarterly Report, Jan. 1—Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

COOLING SUPPLY SYSTEM FOR STAGE 3 BUCKET OF A GAS TURBINE

This is a continuation of application Ser. No. 09/292,445, filed Apr. 15, 1999, now abandoned, the entire content of which is hereby incorporated by reference in this application.

This invention was made with Government support under Contract No. DE-FC21-95MC31176 awarded by the Department of Energy. The Government has certain rights in this invention.

TECHNICAL FIELD

The present invention relates generally to turbines, particularly to land-based gas turbines for power generation, employing compressor air for cooling the buckets of the third turbine stage.

BACKGROUND OF THE INVENTION

Steam cooling of hot gas path components of a gas turbine (for example, the buckets), has been proposed in the past and found viable in land-based power generating plants. While gas turbines are typically air cooled (for example, jet turbines employ compressor discharge air for cooling the hot gas path components), steam cooling is more efficient in that the losses associated with the use of steam as a coolant are not as great as the losses realized by extracting compressor bleed air for cooling. In land based gas turbines and especially those in combined cycle systems, steam cooling is particularly advantageous because the heat energy imparted to the steam as it cools the gas turbine components is recovered as useful work in driving the steam turbine in the combined cycle operation. However, while steam is preferred for cooling the first and second turbine stages, air is required to cool this third stage bucket, and (optionally) to purge the aft portion of the turbine rotor.

BRIEF SUMMARY OF THE INVENTION

In accordance with this invention, air is extracted from the twelfth stage of the compressor and is carried through extraction piping outside the gas turbine, and then supplied through the turbine shell to the stage 3 nozzle. In order to reduce the cycle performance penalty of cooling the third stage bucket, relatively low pressure twelfth stage air is used. The traditional method of bringing air flow from the machine center line practiced by the assignor of this invention is not possible as the forward wheel cavities require high pressure air to drive their purge circuits. Even with steam cooling of the first two bucket stages, air is required to bathe the turbine wheels to control their temperature during transient and start-up operations. In other words, since the forward rotor cavities are filled with high pressure air, a new technique has to be devised for supplying low pressure compressor extraction air for air cooling the third stage. As a result, the bucket cooling air is supplied radially inwardly through the adjacent stator structure, i.e., the third stage nozzle, and then routed to the third stage bucket. In addition, access to relatively low pressure air also provides an optional air source for purge flow in the aft portion of the turbine rotor, with reduced cycle performance penalty. Thus, the invention seeks to introduce low pressure extraction air to the turbine rotor at a low temperature relative to the rotor for use in cooling the third stage bucket. The invention also provides at least an option to make use of the above mentioned air flow to purge the aft section of the turbine rotor, but this is not a preferred arrangement.

In accordance with the invention, a nozzle inducer system comprises a system of tubes carrying the compressor extraction air from the turbine shell through the nozzle airfoils and into the nozzle diaphragm. At the outer end, this tube system penetrates the turbine shell at twenty-two circumferential locations in the exemplary embodiment. Once inside the turbine shell, the piping is split into two conduits, thereby introducing air into forty-four nozzle vanes or airfoils. At the radially inner end of each nozzle vane, the air enters a passage in a diaphragm seal segment which directs the cooling air tangentially into a cavity surrounding the rotor. This passage is configured to accelerate the air in the direction of wheel rotation into this circumferential open area so as to substantially match the tangential velocity of the rotor spacer wheel located radially inwardly of the nozzle. The air is then fed into discrete sets of axial pipes which deliver the air to the shank passages of the stage three buckets. The air then flows radially outwardly through internal passages in the buckets and exits at the bucket tips, into the hot combustion gas path.

The air delivery system in accordance with the invention has several advantages. For example, the use of separate tubing for rotor delivery air minimizes heat transfer to the air from the hot nozzle airfoils. It also allows the use of lower pressure air to pressurize the outer side wall cavities and nozzle cooling circuits which reduces parasitic leakage, improving machine efficiency. In addition, due to the reduction in relative velocity between the rotor spacer wheel and the air, and the drop in air static temperature due to its tangential acceleration, a significantly lower temperature is available for bucket cooling compared to a design where air is simply fed radially into the rotor area.

Accordingly, in its broader aspects, the present invention relates to a land based gas turbine comprising a compressor, a combustor and at least three turbine stages fixed to a rotor, and specifically to an improvement which includes an air cooling circuit for the third turbine stage comprising an inlet into a third stage nozzle from a compressor for feeding cooling air from the compressor to the third stage nozzle; at least one passageway running substantially radially through each airfoil of the third stage nozzle and an associated diaphragm, into an annular space between the rotor and the diaphragm; and passageways communicating between the annular space and individual buckets of the third stage.

The present invention also relates to a method of cooling one stage of a gas turbine comprising a) extracting cooling air from a turbine compressor; b) supplying cooling air to a stationary nozzle adjacent the one stage of the gas turbine; c) establishing a path for the cooling air from the stationary nozzle to a plurality of buckets in the one turbine stage; and d) flowing the cooling air radially outwardly through the plurality of buckets and exhausting the cooling air from radially outer tips of the buckets.

Additional features of the subject invention will become apparent from the detailed description which follows.

DETAILED DESCRIPTION OF THE INVENTION

Figure 1:
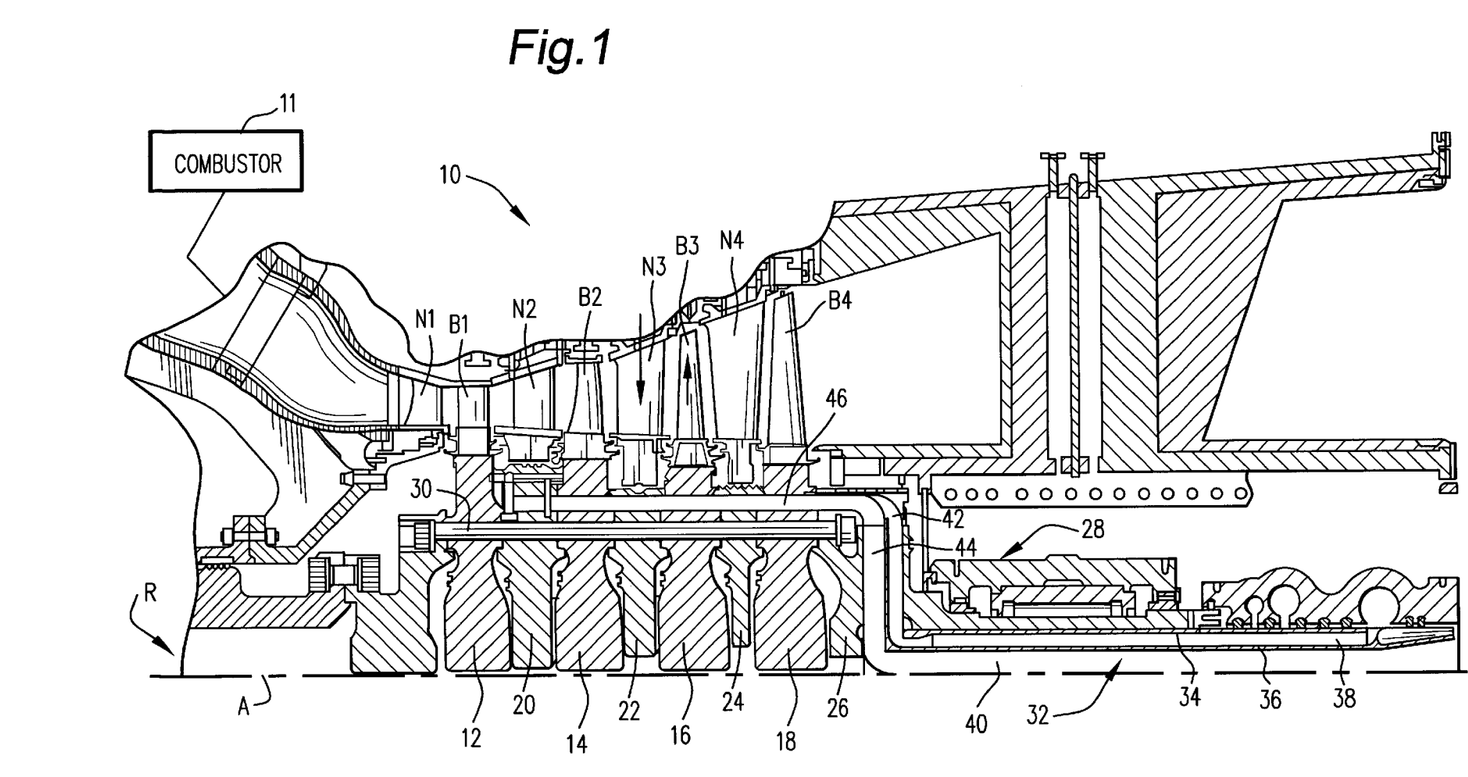
FIG. 1 is a fragmentary longitudinal cross sectional view of a turbine section of a gas turbine, illustrating the environment of the present invention.

With reference to FIG. 1, the turbine section 10 of a gas turbine is partially illustrated. At the outset, it should be appreciated that the gas turbine of this invention is advantageously utilized in a combined cycle system in which the exhaust gases exiting the gas turbine enter a heat recovery steam generator in which water is converted to steam in the manner of a boiler. Steam thus produced drives one or more steam turbines in which additional work is extracted to drive an additional load, such as a second generator, which, in turn, produces additional electric power.

The turbine section 10 of the gas turbine is downstream of the turbine combustor 11 and includes a rotor, generally designated R, with four successive stages comprising turbine wheels 12, 14, 16 and 18 mounted to and forming part of the rotor shaft assembly for rotation therewith. Each wheel carries a row of buckets B1, B2, B3 and B4, the blades of which project radially outwardly into the hot combustion gas path of the turbine. The buckets are arranged alternately between fixed nozzles N1, N2, N3 and N4. Alternately, between the turbine wheels from forward to aft are spacers 20, 22 and 24, each located radially inwardly of a respective nozzle. An aft disk 26 forms an integral part of the aft shaft 28 on the aft side of the last stage turbine wheel 18. It will be appreciated that the wheels and spacers are secured to one another by a plurality of circumferentially spaced axially extending bolts 30 (one shown), as in conventional gas turbine construction.

While not per se part of the present invention, a bore tube assembly 32 forms part of the rotor R and rotates with the rotor about the rotor axis A. The bore tube assembly includes outer and inner tubes 34 and 36 defining annular steam cooling supply passage 38 and spent stream return passage 40. These passages communicate steam to and from the outer rim of the rotor through sets of radial conduits 42, 44 and axially extending conduits (one shown at 46) circumferentially spaced about the rotor rim for supplying cooling steam to the first and second stage buckets B1 and B2. Return or spent cooling steam flows through similar axially and radially extending conduits, respectively, for flow coaxially from the rotor bore via return passage 40. The steam cooling circuit per se, however, forms no part of this invention.

In the exemplary embodiment of this invention, the third stage nozzle N3 includes twenty-two part annular segments 48 (see FIG. 6), each having two stationary vanes or airfoils 50, 52. An air manifold 54 outside the turbine shell is designed to supply air from compressor 55 to twenty-two individual pipes (one shown at 56) which penetrate the turbine shell and which are connected to the twenty-two respective segments. For simplicity, the compressor 55 and manifold 54 are shown schematically in FIG. 2. Inside the shell, the pipe 56 feeds two supply pipes 58, 58a, etc. for each of the forty-four vanes or airfoils (see FIG. 6). Pipes 58, 58a are connected by flexible connector couplings shown at 59. For convenience, only one flow circuit need be described in detail.

Figure 2:
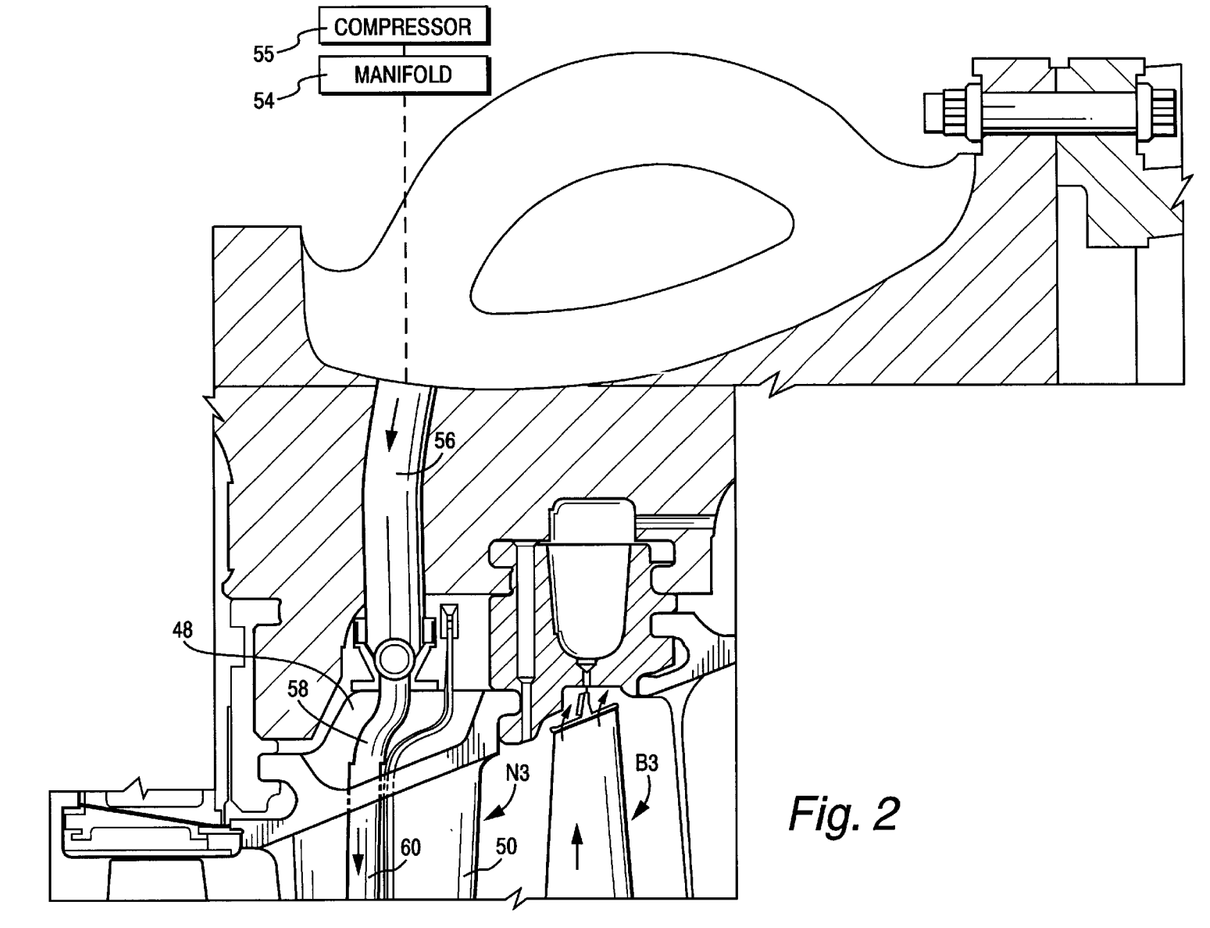
FIG. 2 is a simplified enlarged detail illustrating the air flow inlet to the third stage nozzle and air flow outlet from a third stage bucket in accordance with this invention.
Figure 3:
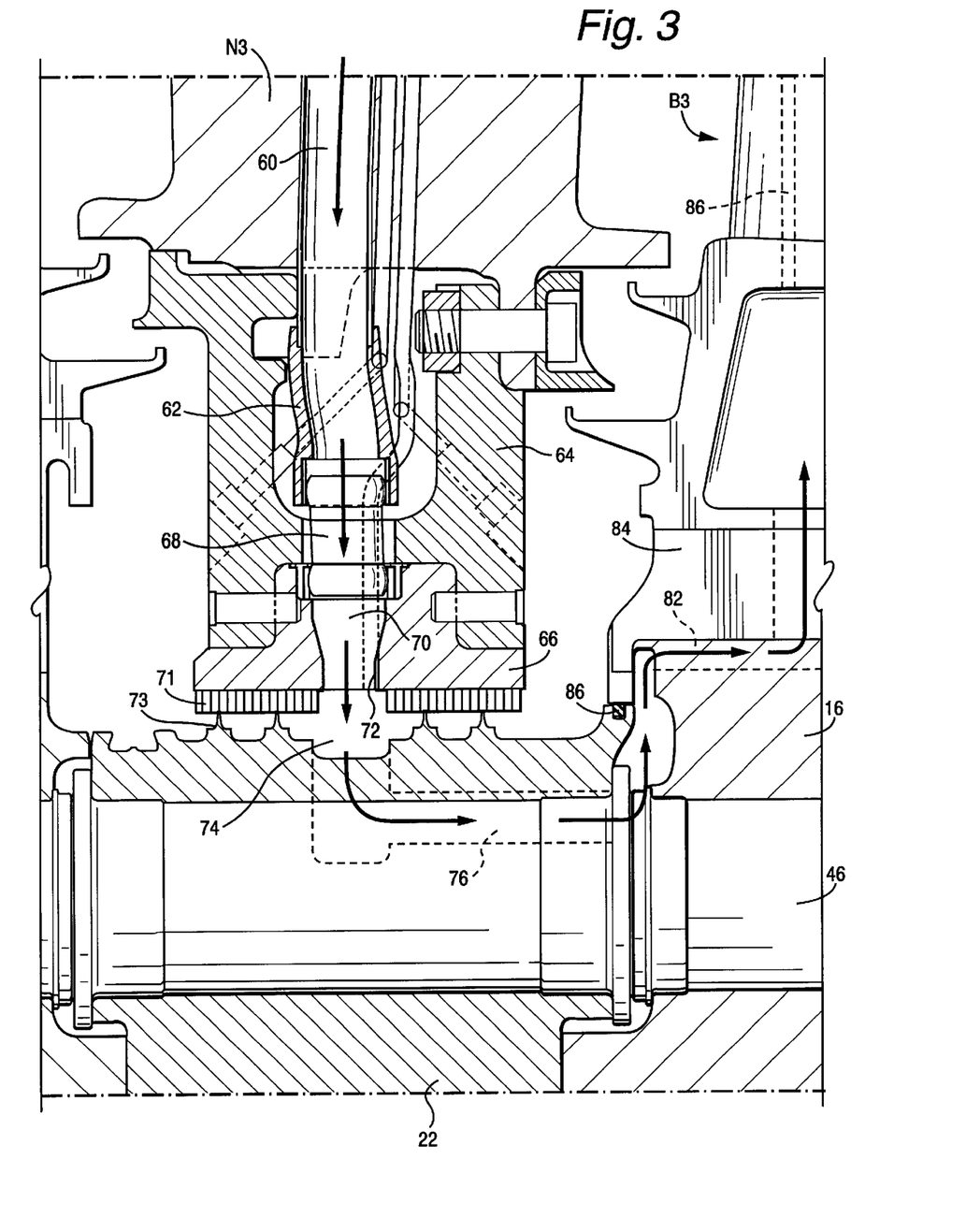
FIG. 3 simplified cross section illustrating the cooling air flow path from the third stage nozzle to the shank portion of a third stage bucket in accordance with the invention.
Figure 6:
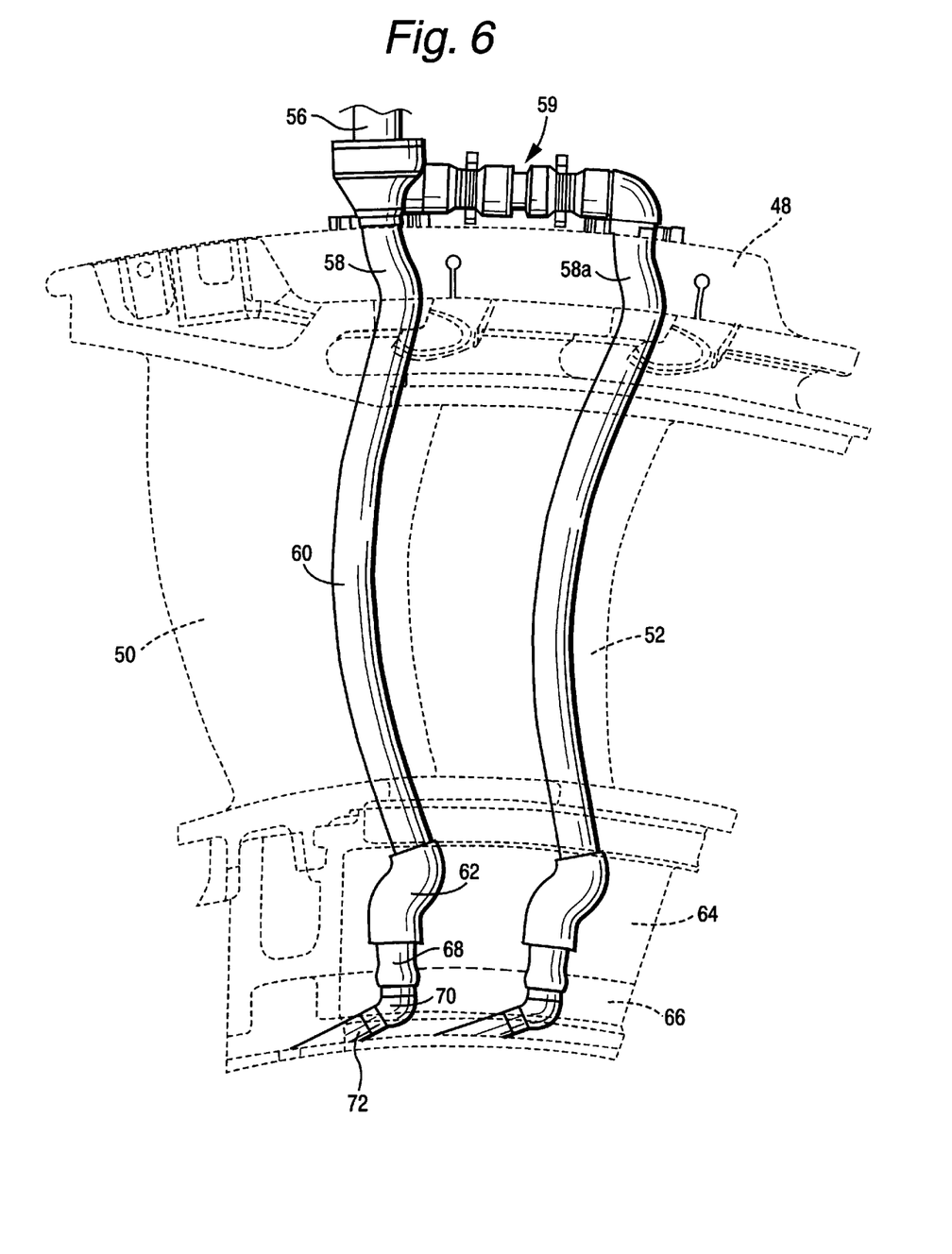
FIG. 6 is a simplified end view of the third stage nozzle and diaphragm illustrating the cooling air flow path in a pair of adjacent nozzle airfoils.

With specific reference to FIGS. 2, 3 and 6, a passage or conduit 60 is shown extending radially within the vane or airfoil 50, with a generally radially extending, flexible coupling or connector 62 (incorporating a carbon bushing, not shown) carrying the air within the diaphragm 64. At its radially inner end, the connector is operatively connected to a diaphragm insert 66 by means of a spoolie device 68. The latter, having generally spherically shaped opposite ends, in combination with the flexible coupling 62, accommodate any relative movement between the insert 66 and the diaphragm 64. As is well known, the diaphragm inserts 66 comprise a plurality of part annular segments extending circumferentially about the rotor, with labyrinth seals 70 engaged with cooperating seals 72 on the rotor spacer wheel 22 to prevent leakage of air along the rotor.

Figure 7:
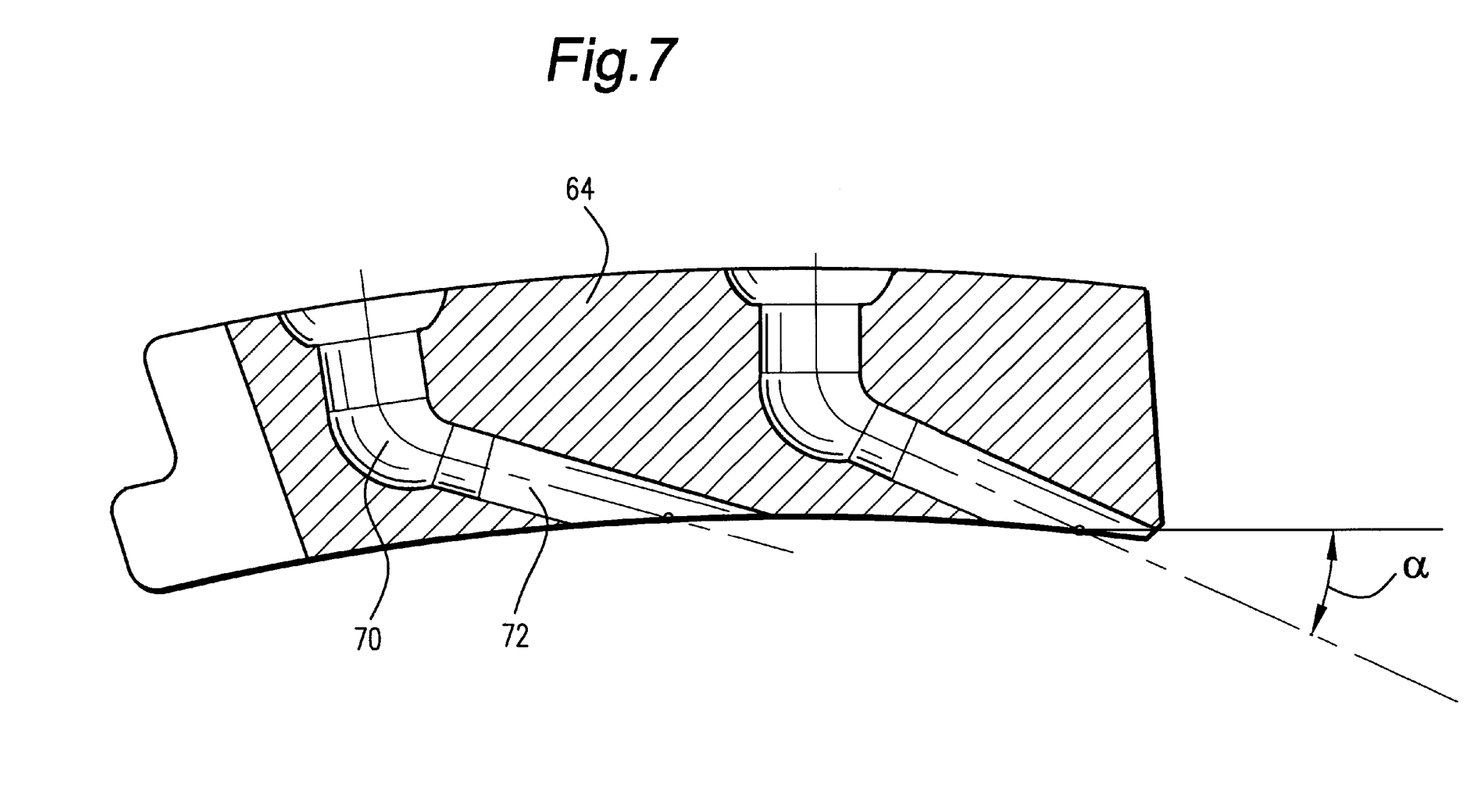
FIG. 7 is an enlarged detail of the tangential cooling air flow passages at the base of the seal segments mounted in the third stage nozzle diaphragm.

Within the insert 66, the air passage changes direction via elbow passage 70 and substantially straight passage 72 to direct the air tangentially (at an angle $\alpha$ of about 22–23°) into an annular rotor cavity 74, as best seen in FIGS. 6 and 7. Passage 70 tapers in the flow direction through an elbow portion to a smaller diameter at passage 72, thereby causing acceleration of the cooling air as it is fed into the annular cavity 74. As a result of this inducer arrangement, the air as supplied to cavity 74 is relatively "still" vis-a-vis the rotor. In other words, the air is fed tangentially at a speed substantially the same as the rotational speed of the rotor. This results in cooler air being available for the third stage buckets, due to the reduction in relative velocity between the rotor spacer wheel and the air, and the drop in air static temperature due to its tangential acceleration.

Figure 4:
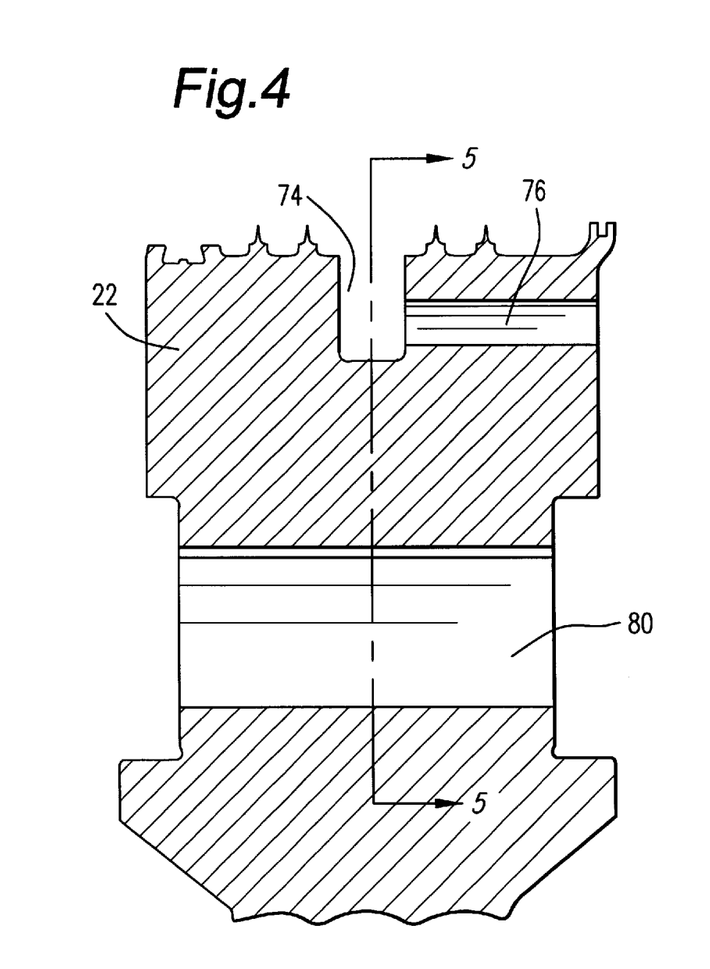
FIG. 4 is a cross section illustrating the axial cooling passages in the stage 2–3 spacer.
Figure 5:
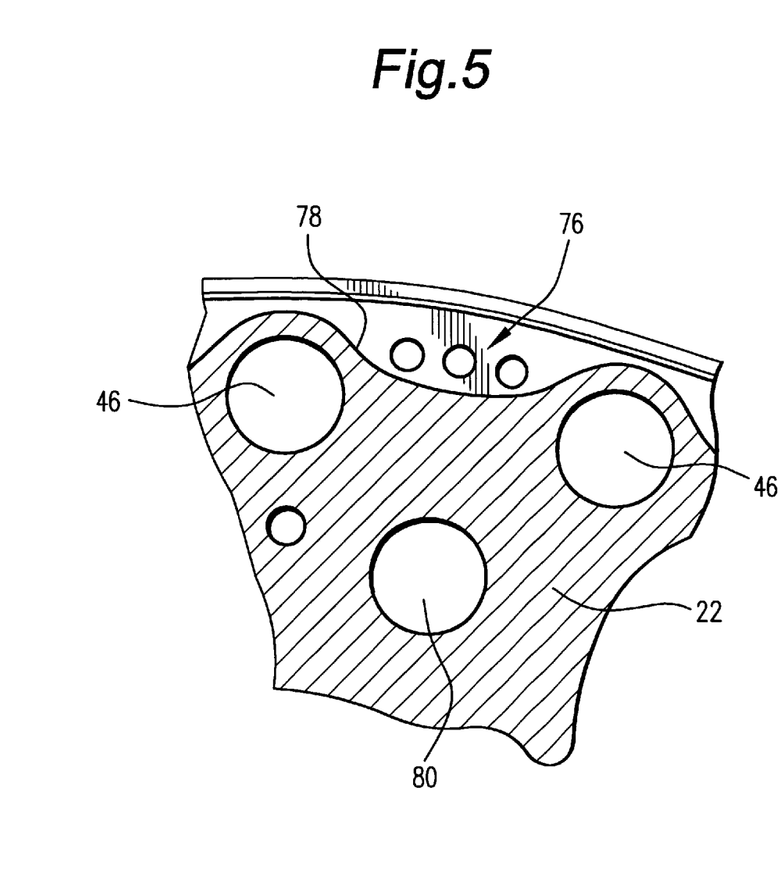
FIG. 5 is a section taken along the line 5—5 of FIG. 4.

From the annular rotor cavity 74, the cooling air moves axially through multiple sets of three passages 76 each (see FIGS. 3, 4 and especially 5), with access to the passages permitted by forming the spacer wheel 22 with scalloped areas 78 about its periphery as best seen in FIG. 5.

Note in this regard that the individual sets of passages 76 are located circumferentially between axial steam supply and return passages 46 and radially outwardly of bores 80 (one shown) for bolts 30.

The air then moves radially outwardly at the interface of spacer 22 and the third stage wheel 16, to an axial supply passage 82 between the wheel rim and the bucket shank. From here, the air travels radially outwardly in one or more radial passages 86, and then vents into the hot gas path at the bucket tips (see the flow arrows in FIGS. 1 and 2). In order to prevent leakage of cooling air between the spacer 22 and wheel 16, an annular wire seal 86 is located within a groove formed in the radially outermost edge of spacer 22. Since the wheel 16 and spacer 22 are rotating together with the rotor, there is no relative frictional movement between the seal 86 and the wheel 16.

While the invention as described relates to air cooling in land based turbines, it can be applied to aircraft turbines as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a land based gas turbine comprising a compressor, a combustor and turbine section including at least first, second and third stages, a cooling circuit comprising:

an inlet into a third stage nozzle from the compressor for feeding cooling air from the compressor to the third stage nozzle; at least one passageway running substantially radially through each airfoil of said third stage nozzle and an associated diaphragm, into an annular space between the rotor and the diaphragm; and passageways communicating between said annular space and individual buckets of said third stage; wherein said at least one passageway includes a portion in said diaphragm configured to feed said cooling air into said annular space substantially tangent to the rotor.

2. The gas turbine of claim 1 wherein said portion of said at least one passageway contracts in the flow direction to accelerate the cooling air as it enters said annular space.

3. The gas turbine of claim 1 wherein said portion of at least one passageway in said diaphragm is provided in a part annular labyrinth seal segment secured to said diaphragm and cooperating with a corresponding seal on a rotor spacer wheel located radially inwardly of said third stage nozzle.

4. The gas turbine of claim 3 wherein means are provided to accommodate relative motion or mismatch between said portion of said at least one passageway in said seal segment and said diaphragm.

5. The gas turbine of claim 1 wherein said inlet to said third stage nozzle includes a manifold external to a casing of said gas turbine.

6. The gas turbine of claim 3 wherein said passageways communicating between said annular space and said individual buckets include plural sets of axial passages through said spacer wheel.

7. In a land based gas turbine comprising a compressor, a combustor and turbine section including at least first, second and third stages, a cooling circuit comprising:

an inlet into a third stage nozzle from the compressor for feeding cooling air from the compressor to the third stage nozzle; at least one passageway running substantially radially through each airfoil of said third stage nozzle and an associated diaphragm, into an annular space between the rotor and the diaphragm; and passageways communicating between said annular space and individual buckets of said third stage; wherein said third stage nozzle includes a plurality of part annular segments, each segment having two nozzle airfoils, and wherein said inlet includes a pipe feeding cooling air to each segment, said pipe supplying cooling air to each of said two nozzle airfoils.

8. The gas turbine of claim 1 including means for supplying cooling steam to the first and second stages.

9. The gas turbine of claim 3 including an annular seal between said spacer wheel and said third stage buckets to prevent leakage of cooling air passing into said third stage buckets.

10. A method of cooling one stage of a gas turbine comprising:

a) extracting cooling air from a turbine compressor;

b) supplying cooling air to a stationary nozzle adjacent said one stage of the gas turbine;

c) establishing a path for said cooling air from said stationary nozzle to a plurality of buckets in said one turbine stage; and d) flowing said cooling air radially outwardly through said plurality of buckets and exhausting said cooling air from radially outer tips of said buckets; wherein during step c), said cooling air is fed tangentially into an annular space surrounding a rotor of said gas turbine.

11. The method of claim 10 wherein said cooling air is accelerated into said annular space.

12. The method of claim 10 wherein said one turbine stage is a third stage.

13. The method of claim 10 wherein said cooling air is supplied to said stationary nozzle via a path outside said gas turbine.

14. In a land based gas turbine comprising a compressor, a combustor and turbine section including at least three stages, a cooling circuit comprising:

means for supplying cooing air from a gas turbine compressor to a stationary nozzle; and means for establishing a cooling air flow path from said nozzle to individual buckets of a turbine stage downstream and adjacent said stationary nozzle.

* * * * *

UNITED STATES PATENT AND TRADEMARK OFFICE
CERTIFICATE OF CORRECTION

PATENT NO. : 6,397,604 B2
DATED : June 4, 2002
INVENTOR(S) : Eldrid et al.

It is certified that error appears in the above-identified patent and that said Letters Patent is hereby corrected as shown below:

Column 1,
Line 54, delete "has" and insert -- had --.

Column 3,
Line 43, delete "stream" and insert -- steam --.

Column 4,
Line 12, delete "70" and insert -- 71 --.
Line 13, delete "72" and insert -- 73 --.

Signed and Sealed this

Fourteenth Day of January, 2003

JAMES E. ROGAN
*Director of the United States Patent and Trademark Office*